(12) United States Patent
Hyytiäinen

(10) Patent No.: US 6,463,502 B1
(45) Date of Patent: Oct. 8, 2002

(54) BACKUP COPYING OF DATA TO A TAPE UNIT WITH A CACHE MEMORY

(75) Inventor: Harri Hyytiäinen, Helsinki (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/068,162

(22) PCT Filed: Nov. 1, 1996

(86) PCT No.: PCT/FI96/00588

§ 371 (c)(1),
(2), (4) Date: Jul. 24, 1998

(87) PCT Pub. No.: WO97/16789

PCT Pub. Date: May 9, 1997

(30) Foreign Application Priority Data

Nov. 2, 1995 (FI) .................................................. 955265

(51) Int. Cl.[7] .............................................. G06F 12/00
(52) U.S. Cl. ........................................ 711/111; 711/162
(58) Field of Search ........................ 711/112, 111, 114, 711/113, 4, 162; 714/6; 369/93; 360/54

(56) References Cited

U.S. PATENT DOCUMENTS

| | | | | |
|---|---|---|---|---|
| 5,034,914 A | * | 7/1991 | Osterlund | 710/52 |
| 5,404,508 A | * | 4/1995 | Konrad et al. | 707/202 |
| 5,598,301 A | * | 1/1997 | Suzuki et al. | 360/53 |
| 5,612,829 A | * | 3/1997 | Takai et al. | 360/54 |
| 5,636,360 A | * | 6/1997 | Courts et al. | 711/145 |
| 5,829,005 A | * | 10/1998 | Senator | 707/100 |
| 2002/0016827 A1 | * | 2/2002 | McCabe et al. | 709/213 |

FOREIGN PATENT DOCUMENTS

DE  19707900 A1 * 9/1998

* cited by examiner

*Primary Examiner*—Matthew Kim
*Assistant Examiner*—Pierre-Michel Bataille
(74) *Attorney, Agent, or Firm*—Pillsbury Winthrop LLP

(57) ABSTRACT

A problem with tape units (TU) arises when writing of data onto a tape is not successful. The computer does not know which blocks (1-25) have been stored successfully. Data blocks are buffered in a ring buffer for so long that one can be sure that the storing on the tape (TA) is successful. The ring buffer can be implemented as buffer areas (BA1, BA2) in disk units (W1, W2). Data blocks are stored not only in the tape unit but also in the first buffer (BA1), until it is filled. Then blocks arm stored in the second buffer (BA2), until this too is filled, and the first buffer (BA1) is used again. When there is a problem with the tape unit, the tape unit is re-initialized, whereby the data in the tape memory (TM) is lost. Loss of data is prevented by reading the data from the ring buffer.

15 Claims, 1 Drawing Sheet

BACKUP COPYING OF DATA TO A TAPE UNIT WITH A CACHE MEMORY

FIELD OF THE INVENTION

The invention relates to a method an apparatus for storing data in a tape unit provided with a cache memory method and apparatus for reading data that has been stored in accordance with the present invention from the tape unit.

DESCRIPTION OF BACKGROUND INFORMATION

FIG. 1 shows parts of a computer system that are essential to the invention. A central processing unit CPU is here considered to contain all necessary parts that have not been specifically mentioned, such as a main memory, display unit, keyboard, etc. For the duration of a power failure, the programs and other information are stored in Winchester disk units W1 and W2, two of which are shown in FIG. 1 by way of example. A disk controller, or interface IF, of the computer of FIG. 1 comprises two buses for disk units, one for each disk unit W1 and W2.

Tape units are often used in computer systems to back up storing of data in a disk unit. Data may be stored either for backup copying or for transmission of data to some other place, e.g. from an exchange to an billing centre. Block TU (Tape Unit) in FIG. 1 shows this kind of a tape unit, or tape recorder. In distributed computer systems, often only one computer is provided with a tape unit. The data of the other computers (CPU') can be stored in the common tape unit via a junction cable C.

Tape units are usually divided into two groups based on the way the tape moves: start/stop tape units and streamer tape units. In the former, the tape is started for writing a data block and stopped after the writing. In streamer tape units, the tape moves basically during the entire backup copying process. In order that the tape could be kept moving even when the computer doing the backup copying performs some other functions, tape units are usually provided with cache memories. Such a cache memory is shown in FIG. 1 by block TM (Tape Memory). When the tape unit TU has received a data block from the computer CPU, it supplies a signal to the computer CPU, acknowledging the reception of the block. The computer may then search a disk unit W1, W2 for the next block. The computer, however, cannot be absolutely certain that the block has really been written onto the tape.

A problem arises when for some reason, the transfer of data from the tape memory TM onto the tape TA has not been successful. There may a weak point in the tape, or some other temporary malfunction may interfere with the storing process. In that case, the tape unit will notice, after a period of time, that the storing has failed. Even if the tape unit TU then sent the computer CPU an appropriate error message, the computer CPU would not know which blocks have been stored successfully and which have not. In prior art solutions, the whole storing process must then be repeated, which waste time. In addition, it should be possible to tell the data transmitting applications in computers CPU and CPU' that the storing will have to be re-started from the beginning. This may sometimes require a change in the applications of different computers. In backup copying, for example, the whole content of the disk units is not always copied but only the areas that have changed since the last backup copy. A problem that may then arise is that a data-transmitting application has marked the areas as backup copied areas. If such a partial backup copying process were repeated, it would no longer be possible to know which areas have changed since the last backup copy. Correspondingly, when a tape unit is used, for example, for transferring billing information, the data-transmitting program may have marked the information as having been sent, and so it may not be possible to send the same information again.

European Patent Application 0,096,456 teaches a tape unit comprising a cache memory. If the unit malfunctions, the data contained in the cache memory can be rewritten onto the tape. In real time systems however, there is not sufficient protection, for example, in a situation where the tape unit Itself or the cache memory of the unit is damaged.

SUMMARY OF THE INVENTION

The object of the invention is to provide a method and an apparatus for implementing a method and apparatus for storing data in a tape unit having a cache memory, and a method and apparatus for reading data stored in accordance with the present invention. As a result the above problems concerning reliability and wasted time are eliminated. Currently preferred embodiments are presented in the dependent claims.

Since so much data to be stored is buffered in a ring buffer external to the tape unit for so long, one can be sure that the storing on the tape has been successfully completed.

The advantage of the method and system according to the invention is that the storing becomes more reliable and less time is wasted. Another advantage is that the process according to the invention is largely transparent to the data-transmitting computers and the applications operating in them. Few or no changes at all are thus needed in the application.

BRIEF DESCRIPTION OF THE DRAWINGS

In the following, the invention will be described in greater detail with reference to currently preferred embodiments illustrated in the accompanying drawings, in which.

DETAILED DESCRIPTION OF THE CURRENTLY PREFERRED EMBODIMENTS OF THE INVENTION

Figure 1:
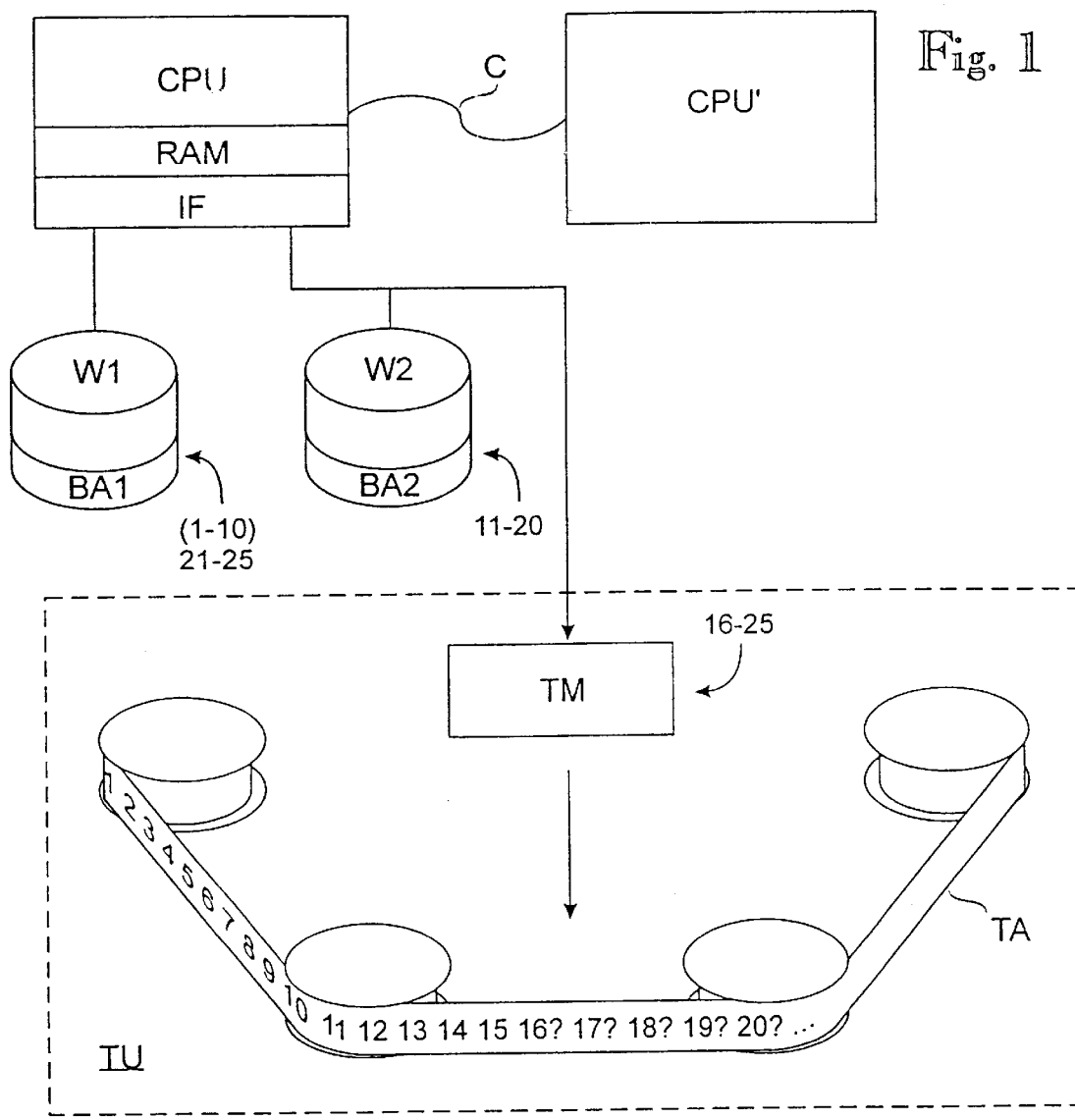
FIG. 1 shows the parts of the invention that are essential to a computer system.

With reference to FIG. 1, loss of data is avoided in the invention by also copying the data stored in a tape unit TU to a ring buffer that is external to the tape unit. The ring buffer could be implemented for example, as a memory block (not shown) formed, e.g., of part of the main memory of a computer CPU. The memory block is preferably of the same size as the tape memory TM of the tape unit TU. Two pointers are arranged in the memory block that serves as a ring buffer: one pointer for writing to the memory and one for reading from the memory. The pointers are incremented after a reading function and a writing function, respectively. When one of the pointers grows bigger than the maximum address in the memory block that serves as a ring buffer, the pointer concerned is returned to the minimum address of the memory block. If a temporary malfunction is detected in the tape unit TU, the copying can be interrupted until the information has been successfully transferred from the ring buffer to the tape TA. If a new attempt flails as well, the tape can be changed and the entire content of the ring buffer copied onto the new tape. If for some reason the ring buffer is bigger than the tape memory TM of the tape unit TU, it is sufficient to copy so much data from the ring buffer as the tape memory TM can hold.

A ring buffer formed of the main memory would be quick and technically simple to implement. A problem, however, is that it does not safeguard against power failure, and it would become unduly expensive to provide such a safeguard.

Less investments are needed if the invention is implemented by simulating the ring buffer in disk units W1 and W2, which may be disks that are used in the computer for other purposes. With regard to the invention, disk units W1 and W2 can also be one and the same disk unit.

The simulation of the ring buffer in disk units W1 and W2 can be implemented, for example, by reserving predetermined buffer areas BA1 and BA2 in disk units W1 and W2. The size of the buffer area is optimally identical to that of the tape memory TM of the tape unit TU. The buffer areas can be processed as disk files, but they can also be implemented in other ways, for example by directly pointing at certain absolute storage addresses of disk units W1 and W2. The storage addresses are called blocks in SCSI disks and usually sectors in other types of disk units. Each data block that is stored in the tape unit TU is also stored in buffer area BA1 until the buffer area is filled. After this, the data blocks to be stored in the tape unit TU are stored in buffer area BA2, until this area too is filled, and then buffer area BA1 is used again, etc.

The program responsible for storing naturally contains information, e.g., in the form of a parameter, indicating which buffer area BA1, BA2 has been used last. In addition, the information can be stored, e.g., as a certain kind of data record as the first record of the buffer area, whereby the first record is used only as a time stamp. Alternatively, the disk control software of the computer can mark the time when the record was last changed in the directory. If the storing has to be continued after a re-start, it is possible to conclude from the time stamps of the buffer areas which buffer area has been used last.

With regard to the invention, it is not essential whether the two buffer areas BA are located in the same disk unit or two different disk units W1 and W2. Even a single buffer area is often sufficient. Two separate buffer areas must be used, for example, when the opening of a file in the writing mode erases the earlier content of the file.

Referring to FIG. 1, we shall now describe how the buffer areas BA1, BA2 are used in problematic situations will be described. For illustrative purposes, let us simply assume that the size of the tape memory TM of the tape unit is 10 data blocks. Let us also assume that the first 25 data blocks have been transferred to the tape unit TU (but not necessarily onto the tape) without an error message. After this, an error message is received from the tape unit TU, and the unit is re-initialized. The situation in the buffer areas BA1 and BA2 is the following. The first 10 data blocks 1–10 were stored in buffer area BA1. The next 10 data blocks 11–20 were stored in buffer area BA2. The last 5 data blocks 21–25, in turn, have been stored at the beginning of buffer area BA1, in the area corresponding to the first five blocks. From FIG. 1 it may seem that data blocks 6–10 are still stored at the end of buffer area BA1. This is not necessarily the case, at least not in all operating systems. When buffer area BA1 was last opened for writing, e.g., as a file, the disk control software may have reset the size of the file. It is then no longer possible to use that part of buffer are BA1, which was written to in the previous round.

Since the error message was received at block 25 and the size of the tape memory is 10 data blocks, one can assume that at least the first 15 blocks have been successfully stored on the tape. The question marks at blocks 16–25 indicate that the fate of these blocks is not certain. If the tape unit TU is here re-initialized, the data located in its tape memory TM will probably be lost. Since the size of buffer areas BA1 and BA2 corresponds to the size of the tape memory TM, the data located in the tape memory can also be read from buffer areas BA1 and BA2.

The operation now continues such that the data-transmitting application is commanded to temporarily interrupt the transmission of data. The filing of the active buffer area (here BA1) is simultaneously stopped, for example, by closing the file concerned. The cause of the problem is then eliminated, for example, by re-initializing the tape unit TU. Data blocks 16–20 are then copied from buffer area BA2 on s the tape TA. After this, data blocks 21–25 are copied from buffer area BA1 to the tape TA. Both buffer areas BA1 and BA2 can now be closed, and they can be re-filled starting e.g., from the beginning of the first buffer area BA1, and the data-transmitting application can be informed that the transmission of data can be continued.

The data can be copied onto the tape TA, for example, by transferring the data to the tape memory TM of the tape unit TU, commanding the tape unit to empty the tape memory TM onto the tape TA and observing the status of the tape unit TU. If the tape unit TU sends an error message, the cause of the error must be found and eliminated, for example, by changing the tape TA.

Figure 2:
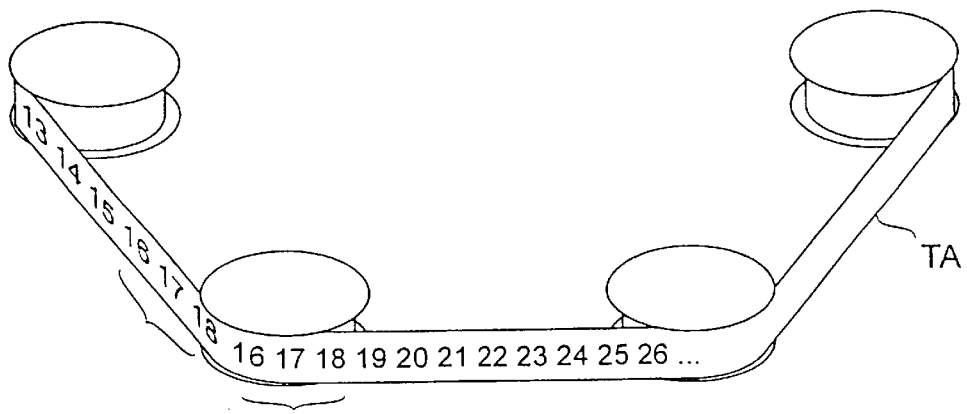
FIG. 2 illustrates data blocks stored on a tape.

FIG. 2 shows a possible order of the data blocks of the tape produced in the process. From the error message sent by the tape unit TU it was possible to conclude that the error occurred at one of blocks 16–25. Let us assume, by way of example, that the error occurred at block 19. The first 18 data blocks were thus successfully stored on the tape. Subsequently, data blocks 16–25 were stored on it to be on the safe side. Blocks 16–18 are thus on the tape twice. It is also possible that the first set of blocks 16–18 are on a different tape from the second set of blocks 16–18. Since the data blocks to be stored on the tape also contain the identifier of the block, the identifiers can be used for preventing one and the same block from being returned to the application twice. The duplication could also be prevented, e.g. by keeping account of the biggest block identifier that has been read When during the reading process a block is found in the material that has an identifier that is smaller than or equal to an identifier that has already been read, the block can be rejected.

It is obvious to a person skilled in the art that as the art develops, it will be possible to implement the basic idea of the invention in many different ways. The invention and its embodiments are not limited to the examples described above but they can vary freely within the scope of the claims.

What is claimed is:

1. A computer system, comprising:

at least one computer having a disk unit;

a tape unit provided with both a tape memory and a tape for storing data as blocks;

a ring buffer external to said tape unit, said ring buffer being at least as large as said tape memory of said tape unit, said computer being arranged to store said data blocks not only in said tape unit but also in said ring buffer and, when said tape unit malfunctions, write said blocks contained in said ring buffer to said tape unit as soon as said tape unit is again ready to operate, wherein each of said blocks is written onto said tape at least once;

a mechanism configured to read data from the tape of the tape unit in which, when data has been stored as a plurality of blocks, each of the blocks has an identifier and the data is read from the tape unit as a plurality of blocks; and a mechanism configured to use the block identifiers to ensure that blocks written to the tape twice are not returned to an application twice.

2. The computer system according to claim 1, wherein said ring buffer is formed of a random access memory.

3. The computer system according to claim 2, wherein said random access memory is safeguarded against power failure.

4. The computer system according to claim 1, wherein said ring buffer is formed as at least one predetermined area in at least one disk unit.

5. The computer system according to claim 4, wherein said ring buffer is formed as at least two predetermined areas in at least one disk unit.

6. A computer system, comprising:

at least one computer having a disk unit;

a tape unit provided with both a tape memory and a tape for storing data as blocks; and a ring buffer external to said tape unit, said ring buffer being at least as large as said tape memory of said tape unit, said computer being arranged to store said data blocks not only in said tape unit but also in said ring buffer and, when said tape unit malfunctions, write said blocks contained in said ring buffer to said tape unit as soon as said tape unit is again ready to operate, wherein each of said blocks is written onto said tape at least once, wherein said ring buffer is formed as at least two predetermined areas in at least one disk unit, and wherein each of said blocks of data has an identifier;

when reading said data blocks from said tape unit, keep account of and maintain a biggest block identifier that has been read; and compare a last read block identifier with said biggest block identifier that has been read, and in response to said last read block identifier being larger than said biggest block identifier so far read, transferring said block to an address indicated by said identifier, and when said last read block identifier is less than or equal to said biggest block identifier read so far, rejecting said block.

7. A method for storing data on a tape of a tape unit including both a tape memory and the tape, wherein data to be stored is divided into a plurality of blocks and said blocks are written to said tape unit, said method comprising:

writing said blocks to be stored to a ring buffer, said ring buffer being external to said tape unit and at least as big as said tape memory of said tape unit;

when said tape unit malfunctions, writing blocks written to said ring buffer to said tape unit as soon as said tape unit is again ready to operate, whereby each said block is written onto said tape at least once;

reading data from the tape of the unit in which, when data has been stored as a plurality of blocks, each of the blocks has an identifier and the data is read from the tape unit as a plurality of blocks; and using the block identifiers to ensure that blocks written to the tape twice are not returned to an application twice.

8. The method according to claim 7, wherein when said blocks have been written from said ring buffer to said tape unit, said tape unit is commanded to write said blocks from said tape memory to said tape.

9. The method according to claim 8 or 7, wherein said ring buffer is formed by random access memory.

10. The method according to claim 9, wherein said random access memory is safeguarded against power failure.

11. The method according to claim 8 or 7, wherein said ring buffer is formed as at least one predetermined area in at least one disk unit.

12. The method according to claim 11, wherein said ring buffer is formed as at least two predetermined areas in at least one disk unit.

13. The method according to claim 7, further comprising reusing the ring buffer several times during the writing of one tape.

14. The method according to claim 7, wherein the size of the ring buffer is smaller than the capacity of the tape.

15. A method for storing data on a tape of a tape unit including both a tape memory and the tape, wherein data to be stored is divided into a plurality of blocks and said blocks are written to said tape unit, said method comprising:

writing said blocks to be stored to a ring buffer, said ring buffer being external to said tape unit and at least as big as said tape memory of said tape unit;

when said tape unit malfunctions, writing blocks written to said ring buffer to said tape unit as soon as said tape unit is again ready to operate, whereby each said block is written onto said tape at least once;

reading data from said tape of said tape unit in which, when data has been stored as a plurality of blocks, each of said blocks has an identifier and said data is read from said tape unit as a plurality of blocks;

keeping account of and maintaining a biggest block identifier that has been read; and in response to said block identifier being smaller than or equal to the block identifier already read, rejecting the block concerned.

\* \* \* \* \*